United States Patent
Ling et al.

(10) Patent No.: US 12,432,667 B2
(45) Date of Patent: *Sep. 30, 2025

(54) METHOD AND APPARATUS FOR POWER CONTROL OF PHYSICAL UPLINK CONTROL CHANNEL REPETITIONS

(71) Applicant: Lenovo (Beijing) Ltd., Beijing (CN)

(72) Inventors: Wei Ling, Beijing (CN); Chenxi Zhu, Beijing (CN); Bingchao Liu, Beijing (CN); Yi Zhang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 393 days.

This patent is subject to a terminal disclaimer.

(21) Appl. No.: 17/920,612

(22) PCT Filed: Apr. 22, 2020

(86) PCT No.: PCT/CN2020/086121
§ 371 (c)(1),
(2) Date: Oct. 21, 2022

(87) PCT Pub. No.: WO2021/212363
PCT Pub. Date: Oct. 28, 2021

(65) Prior Publication Data
US 2023/0156626 A1    May 18, 2023

(51) Int. Cl.
*H04W 52/36* (2009.01)
*H04W 52/08* (2009.01)
*H04W 52/14* (2009.01)

(52) U.S. Cl.
CPC ......... *H04W 52/36* (2013.01); *H04W 52/08* (2013.01); *H04W 52/146* (2013.01)

(58) Field of Classification Search
CPC ... H04W 52/36; H04W 52/08; H04W 52/146; H04W 52/242; H04W 52/48;
(Continued)

(56) References Cited

U.S. PATENT DOCUMENTS

| 9,148,818 B2 | 9/2015 | Yue et al. |
| 12,395,941 B2 | 8/2025 | Ling et al. |

(Continued)

FOREIGN PATENT DOCUMENTS

| CN | 102378341 A | 3/2012 |
| CN | 107124754 A | 9/2017 |

(Continued)

OTHER PUBLICATIONS 20932097.7 , "Extended European Search Report", EP Application No. 20932097.7, Dec. 7, 2023, 9 pages.

(Continued)

*Primary Examiner* — Lana N Le
(74) *Attorney, Agent, or Firm* — FIG. 1 Patents

(57) ABSTRACT

Embodiments of the present disclosure are related to a method and apparatus for power control of a physical uplink control channel (PUCCH) repetition of a PUCCH transmission with one or more beams or multiple transmit-receive points (TRPs). A method according to an embodiment of the present disclosure includes: receiving configuration information regarding a plurality of PUCCH repetitions of a PUCCH transmission, wherein the configuration information includes a plurality of power control parameter sets corresponding to the plurality of PUCCH repetitions; determining power for each PUCCH repetition of the plurality of PUCCH repetitions according to the configuration information and a mapping relationship between the each PUCCH repetition and a power control parameter set of the plurality of power control parameter sets; and transmitting, by using the determined power for the each PUCCH repetition, the each PUCCH repetition in a time interval of a plurality of time intervals.

20 Claims, 5 Drawing Sheets beam parameter mapping pattern: 0011

(58) Field of Classification Search
CPC ... H04W 52/54; H04W 52/32; H04W 52/325; H04W 72/1268; H04W 72/0446; H04W 72/23; H04W 72/21; H04W 72/51; H04W 72/0473; H04W 52/346; H04W 72/20; H04W 72/232; H04W 52/38; H04W 52/143; H04W 52/14; H04W 48/12; H04W 74/002
See application file for complete search history.

(56) References Cited

U.S. PATENT DOCUMENTS

| | | | |
|---|---|---|---|
| 2016/0087709 | A1 | 3/2016 | Horiuchi et al. |
| 2016/0315683 | A1 | 10/2016 | Liu et al. |
| 2017/0272141 | A1 | 9/2017 | Horiuchi et al. |
| 2018/0279145 | A1 | 9/2018 | Jung et al. |
| 2019/0190675 | A1 | 6/2019 | Takeda et al. |
| 2019/0199487 | A1 | 6/2019 | Ko et al. |
| 2019/0261281 | A1 | 8/2019 | Jung et al. |
| 2019/0273637 | A1 | 9/2019 | Zhang et al. |
| 2019/0281588 | A1 | 9/2019 | Zhang et al. |
| 2019/0319823 | A1 | 10/2019 | Akkarakaran et al. |
| 2019/0349864 | A1* | 11/2019 | Zhang ............. H04W 52/325 |
| 2019/0349867 | A1 | 11/2019 | Molavianjazi et al. |
| 2019/0373596 | A1 | 12/2019 | Saito et al. |
| 2019/0380123 | A1 | 12/2019 | Yang et al. |
| 2020/0068497 | A1 | 2/2020 | Gong et al. |
| 2020/0314860 | A1* | 10/2020 | Zhou ................ H04W 72/23 |
| 2020/0344810 | A1 | 10/2020 | Xiong et al. |
| 2021/0160793 | A1* | 5/2021 | Osawa .............. H04W 72/23 |
| 2022/0046635 | A1* | 2/2022 | Liou ................ H04W 52/325 |
| 2022/0191882 | A1* | 6/2022 | Lee ................. H04W 72/51 |
| 2022/0240269 | A1* | 7/2022 | Minotani ........... H04W 72/20 |
| 2022/0271890 | A1* | 8/2022 | Grossmann ........ H04W 52/242 |
| 2023/0087394 | A1* | 3/2023 | Yuan ................ H04W 72/23 |
| 2023/0239804 | A1* | 7/2023 | Cozzo .............. H04W 52/146 455/522 |
| 2023/0309022 | A1 | 9/2023 | Ling et al. |
| 2025/0097935 | A1* | 3/2025 | Shim ................. H04W 72/04 |

FOREIGN PATENT DOCUMENTS

| | | |
|---|---|---|
| CN | 110536399 A | 12/2019 |
| CN | 110831197 A | 2/2020 |
| CN | 110972251 A | 4/2020 |
| CN | 111052658 A | 4/2020 |
| WO | 2018080260 A1 | 5/2018 |
| WO | 2019027308 A1 | 2/2019 |
| WO | 2019230003 A1 | 12/2019 |
| WO | 2020034442 A1 | 2/2020 |

OTHER PUBLICATIONS

Lenovo, et al., "Discussion of multi-TRP/panel transmission", 3GPP TSG RAN WG1 Meeting #99, R1-1912316, Reno, USA [retrieved Jun. 15, 2022]. Retrieved from the Internet <https://portal.3gpp.org/ngppapp/TdocList.aspx?meetingId=32827>, Nov. 2019, 11 pages.
VIVO , "Further Discussion on Multi-TRP Transmission", 3GPP TSG RAN WG1 #96bis, R1-1904096, Xi'an, China [retrieved Dec. 12, 2023]. Retrieved from the Internet <https://www.3gpp.org/ftp/tsg_ran/WG1_RL1/TSGR1_96b/Docs>, Apr. 2019, 14 pages.
202080098671.X , "Foreign Office Action", CN Application No. 202080098671.X, Aug. 30, 2024, 31 pages.
Huawei , et al., "Introduction of further NB-IoT enhancements other than EDT in TS 36.331", 3GPP TSG-RAN2 Meeting #103, R2-1811543, Gothenburg, Sweden, Aug. 2018, 77 pages.
PCT/CN2020/086121 , "International Preliminary Report on Patentability", PCT Application No. PCT/CN2020/086121, Nov. 3, 2022, 5 pages.
PCT/CN2020/086121 , "International Search Report and Written Opinion", PCT Application No. PCT/CN2020/086121, Jan. 20, 2021, 6 pages.
"Corrected Notice of Allowability", U.S. Appl. No. 17/999,587, May 2, 2025, 3 pages.
"Notice of Allowance", U.S. Appl. No. 17/999,587, Mar. 26, 2025, 11 pages.
"Foreign Office Action", CN Application No. 202080100954.3, Apr. 2, 2025, 20 pages.
"Foreign Office Action", CN Application No. 202080100954.3, Sep. 3, 2024, 18 pages.
"Foreign Office Action", CN Application No. 202080100954.3, Jan. 26, 2025, 16 pages.
"Extended European Search Report", European Application No. 20937129.3, Jan. 30, 2024, 16 pages.
"Text proposals for enhancements on 1-15 Multi-TRP and panel Transmission", 3GPP Draft; RI-2001726, 3rd Generation Partnership Project (3GPP), Mobile Competence Centre; 650, Route Des Lucioles; F-06921 Sophia-Antipolis Cedex; France, vol. RAN WGI, Apr. 10, 2020, 12 pages.
Ericsson, "Enhancements to UL Configured Grant Transmission for NR URLLC", 3GPP TSG-RAN WG1 Meeting #99, R1-1911950, Reno, USA, Nov. 2019, 9 pages.
NTT Docomo, Inc., "Draft CR for configured grant uplink transmission", 3GPP TSG-RAN WG1 Meeting #95, R1-1814142, Spokane, USA [retrieved Dec. 15, 2022]. Retrieved from the Internet <https://www.3gpp.org/ftp/tsg_ran/WG1_RL1/TSGR1_95/Docs/>., Nov. 2018, 5 Pages.
"International Preliminary Report on Patentability", PCT Application No. PCT/CN2020/091798, Dec. 1, 2022, 5 pages.
"International Search Report and Written Opinion", PCT Application No. PCT/CN2020/091798, Feb. 25, 2021, 6 pages.
"Notice of Allowance", U.S. Appl. No. 17/999,587, filed Jul. 15, 2025, 8 pages.
"Foreign Office Action", EP Application No. 20932097.7, Jun. 20, 2025, 7 pages.

* cited by examiner

METHOD AND APPARATUS FOR POWER CONTROL OF PHYSICAL UPLINK CONTROL CHANNEL REPETITIONS

TECHNICAL FIELD

Embodiments of the present disclosure are related to wireless communication technology, and more particularly, related to methods and apparatuses for power control of physical uplink control channel (PUCCH) repetitions of a PUCCH transmission with one or more beams or multiple transmit-receive points (TRPs).

BACKGROUND

In a wireless communication system, the term "beam" is introduced for wireless communications in high frequency bands, such as FR2 (from 24.25 GHz to 52.6 GHz) or other frequency bands higher than 6 GHz. A beam refers to a main lobe of the radiation pattern of an antenna array or a panel. Each beam is associated with a spatial transmitter or receiver.

Currently, in a 3rd Generation Partnership Project (3GPP) New Radio (NR) system or the like, details regarding how to improve the reliability and robustness of an uplink (UL) transmission by using one or more beams when there are multiple beam links between a user equipment (UE) and a base station (BS) have not been specifically discussed in 3GPP 5G NR technology yet.

SUMMARY

Some embodiments of the present application provide a method for wireless communications. The method may be performed by a UE. The method includes: receiving configuration information regarding a plurality of PUCCH repetitions of a PUCCH transmission, wherein the configuration information includes a plurality of power control parameter sets corresponding to the plurality of PUCCH repetitions; determining power for each PUCCH repetition of the plurality of PUCCH repetitions according to the configuration information and a mapping relationship between the each PUCCH repetition and a power control parameter set of the plurality of power control parameter sets; and transmitting, by using the determined power for the each PUCCH repetition, the each PUCCH repetition in a time interval of a plurality of time intervals.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method for wireless communications. The method may be performed by a BS. The method includes: transmitting configuration information regarding a plurality of PUCCH repetitions of a PUCCH transmission, and the configuration information includes a plurality of power control parameter sets corresponding to the plurality of PUCCH repetitions; and receiving each PUCCH repetition of the plurality of PUCCH repetitions in a time interval of a plurality of time intervals, and power for the each PUCCH repetition is determined according to the configuration information and a mapping relationship between the each PUCCH repetition and a power control parameter set of the plurality of power control parameter sets.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, and the computer-executable instructions cause the processor to implement the above-mentioned method performed by a BS.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
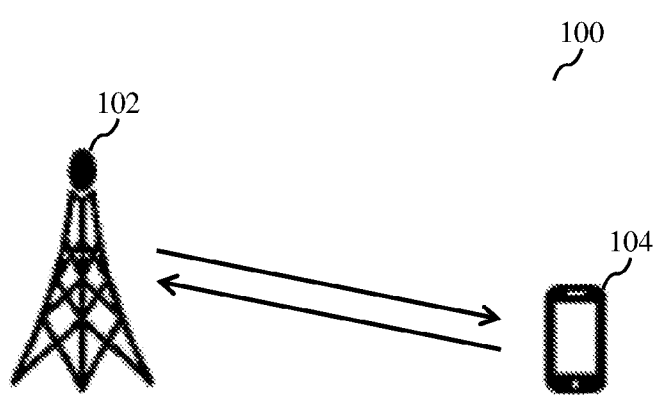
FIG. 1 illustrates a schematic diagram of a wireless communication system in accordance with some embodiments of the present application.

FIG. 1 illustrates a schematic diagram of a wireless communication system 100 in accordance with some embodiments of the present application.

As shown in FIG. 1, the wireless communication system 100 includes a BS 102 and a UE 104. Although merely one BS is illustrated in FIG. 1 for simplicity, it is contemplated that the wireless communication system 100 may include more BSs in some other embodiments of the present disclosure. Similarly, although merely one UE is illustrated in FIG. 1 for simplicity, it is contemplated that the wireless communication system 100 may include more UEs in some other embodiments of the present disclosure.

The BS 102 may also be referred to as an access point, an access terminal, a base, a macro cell, a node-B, an enhanced node B (eNB), a gNB, a home node-B, a relay node, or a device, or described using other terminology used in the art. The BS 102 is generally part of a radio access network that may include a controller communicably coupled to the BS 102.

The UE 104 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 104 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 104 may include wearable devices, such as smart watches, fitness bands, optical head-mounted displays, or the like. Moreover, the UE 104 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The UE 104 may communicate with the BS 102 to receive data packets from the BS 102 on downlink (DL) and/or transmit data packets to the BS 102 on uplink (UL). The UE 104 may activate multiple panels for communications between the UE 104 and the BS 102, and report the panel status to the BS 102 by higher layer signaling such as radio resource control (RRC) signaling or medium access control (MAC) control element (CE) signaling.

In 3GPP NR Release 15, a mechanism of PUCCH repetitions with inter-slot frequency hopping has already been supported for improving the robustness of PUCCH transmissions, and has been drafted in 3GPP standard document TS38.213. A UL beam is expressed as spatial relation information.

Multiple PUCCH power control parameter sets may be configured for a PUCCH transmission with PUCCH repetitions, and each PUCCH power control parameter set is associated with a piece of spatial relation information configured for the PUCCH transmission.

As drafted in 3GPP standard document TS38.331, each piece of PUCCH spatial relation information is mapped to a set of PUCCH power control parameters which includes PUCCH pathloss reference signal (RS), p0-PUCCH, and a closed loop index. Specifically, TS38.331 defines "PUCCH-SpatialRelationInfo information element" as follows:

| PUCCH-SpatialRelationInfo information element |
| --- |
| -- ASN1START |
| -- TAG-PUCCH-SPATIALRELATIONINFO-START |
| PUCCH-SpatialRelationInfo ::= SEQUENCE { |
|     pucch-SpatialRelationInfoId     PUCCH-SpatialRelationInfoId, |
|     servingCellId     ServCellIndex |
|     OPTIONAL, -- Need S |
|     referenceSignal     CHOICE { |
|         ssb-Index     SSB-Index, |
|         csi-RS-Index     NZP-CSI-RS-ResourceId, |
|         srs     SEQUENCE { |
|             resource     SRS-ResourceId, |
|             uplinkBWP     BWP-Id |
|         } |
|     }, |
|     pucch-PathlossReferenceRS-Id     PUCCH-PathlossReferenceRS-Id, |
|     p0-PUCCH-Id     P0-PUCCH-Id, |
|     closedLoopIndex     ENUMERATED { i0, i1 } |
| } |
| PUCCH-SpatialRelationInfoId ::=     INTEGER (1..maxNrofSpatialRelationInfos) |

In addition, 3GPP standard document TS38.213 defines that:

If a UE is provided PUCCH-SpatialRelationInfo, the UE obtains a mapping, by an index provided by p0-PUCCH-Id, between a set of pucch-SpatialRelationInfoId values and a set of p0-PUCCH-Value values;

If the UE is provided two or more values for pucch-SpatialRelationInfoId and the UE receives an activation command [11, TS38.321] indicating a value of pucch-SpatialRelationInfoId, the UE determines the p0-PUCCH-Value value through the link to a corresponding p0-PUCCH-Id index;

If the UE is not provided PUCCH-SpatialRelationInfo, the UE obtains the p0-PUCCH-Value value from the P0-PUCCH with p0-PUCCH-Id value equal to the minimum p0-PUCCH-Id value in p0-Set;

If the UE is provided pathlossReferenceRSs and PUCCH-SpatialRelationInfo, the UE obtains a mapping, by indexes provided by corresponding values of pucch-PathlossReferenceRS-Id, between a set of pucch-SpatialRelationInfoId values and a set of referenceSignal values provided by PUCCH-PathlossReferenceRS.

If the UE is provided more than one values for pucch-SpatialRelationInfoId and the UE receives an activation command [11, TS38.321] indicating a value of pucch-SpatialRelationInfoId, the UE determines the referenceSignal value in PUCCH-PathlossReferenceRS through a link between the UE and a BS to a corresponding pucch-PathlossReferenceRS-Id index; and If the UE is provided pathlossReferenceRSs and is not provided PUCCH-SpatialRelationInfo, the UE obtains the referenceSignal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking.

During 3GPP NR Release 17 study item phase, PUCCH repetitions with one or more beams or multiple TRPs in multiple slots can utilize the spatial diversity of one or more beams or multiple TRPs of a PUCCH transmission to increase the reliability and robustness. Considering a PUCCH transmission with PUCCH repetitions by using one or more beams may be received by multiple TRPs, a power control of the PUCCH repetitions should be different according to different links between a UE and different TRPs. The power control of a PUCCH transmission with one or more beam corresponding to different TRP receptions should be separately controlled. Therefore, an issue on how to enhance a power control of PUCCH repetitions of a PUCCH transmission needs to be solved.

Based on this, one object of the embodiments of the present application targets to the future enhancement of PUCCH repetitions of a PUCCH transmission in 3GPP NR Release 17 on one or more beams or multiple TRPs, which involves issues on how to improve reliability and robustness of physical downlink control channel (PDCCH), physical uplink shared channel (PUSCH), and PUCCH transmissions by using multi-TRP and/or multi-panel, especially, when there are multiple beam links between a UE and a BS and etc. More details on the embodiments of the present disclosure will be illustrated in the following text in combination with the appended drawings.

3GPP NR Release 16 supports PDSCH repetition with one or more beams in a "single DCI based multiple TRPs" case, which implies that a backhaul of multiple TRPs is ideal or almost ideal. Some embodiments of the present application assume that one or more beams are configured or indicated for PUCCH repetition in the "single DCI based multiple TRPs" case.

Figure 2:
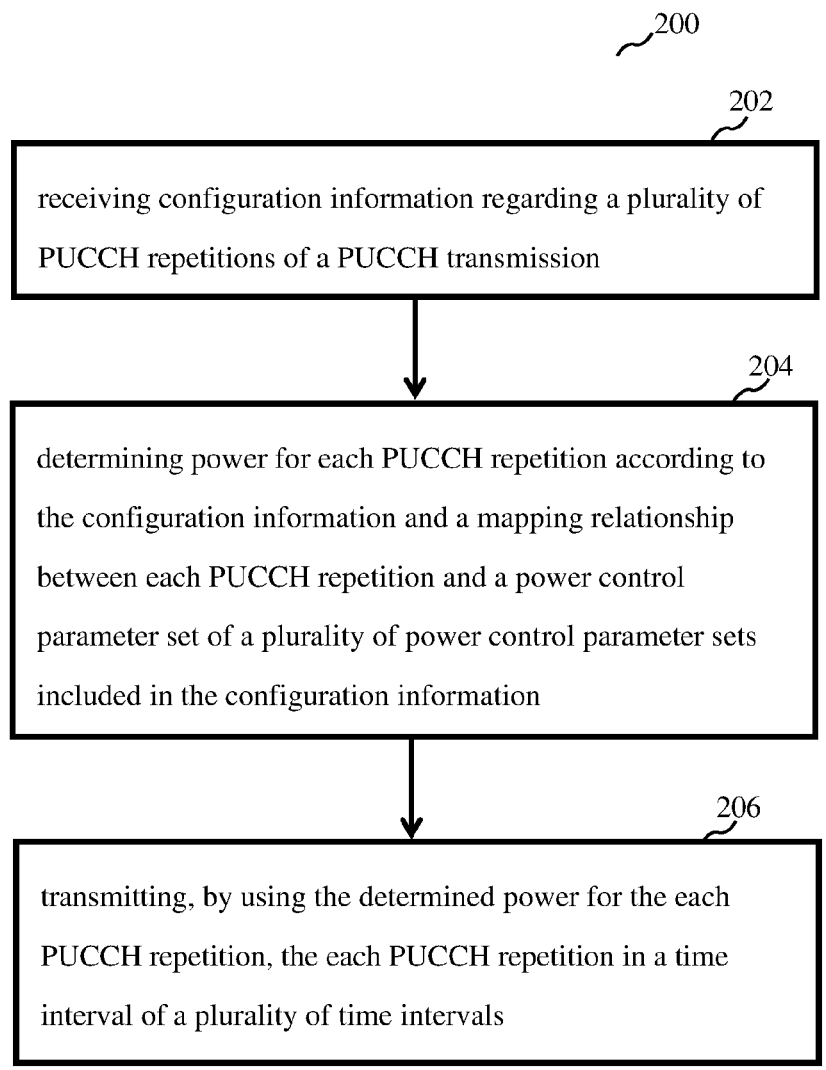
FIG. 2 illustrates a flow chart of a method for wireless communications in accordance with some embodiments of the present application.

FIG. 2 illustrates a flow chart of a method for wireless communications in accordance with some embodiments of the present application. The method may be implemented by a UE (e.g., UE 104 as illustrated and shown in FIG. 1).

In the exemplary method 200 as illustrated and shown in FIG. 2, in step 202, a UE may receive configuration information regarding a plurality of PUCCH repetitions of a PUCCH transmission. In some embodiments of the present disclosure, the configuration information is configured by RRC signaling.

In some embodiments of the present disclosure, the configuration information includes a plurality of power control parameter sets corresponding to the plurality of PUCCH repetitions. Each power control parameter set of the plurality of the power control parameter sets may at least include a power offset identifier, a pathloss reference RS identifier, and a closed loop index.

The power offset identifier may be included in a power offset list, the pathloss reference RS identifier is included in a pathloss reference RS list, and the closed loop index is a value of a plurality of predefined values. For instance, the power offset list or the pathloss reference RS list may be configured by high layer signaling.

In an embodiment of the present disclosure, each power control parameter set may be associated with a transmit power control (TPC) command indicated by a downlink control information (DCI). The DCI is associated with the closed loop index included in the each power control parameter set in the configuration information. The DCI may be used for scheduling the PUCCH transmission. For example, the DCI includes a TPC command field, and the TPC command field indicates TPC commands of a plurality of closed loop indexes.

In an embodiment of the present disclosure, each power control parameter set of the plurality of power control parameter sets in the configuration information is associated with one piece of spatial relation information of a plurality of pieces of spatial relation information configured for the PUCCH transmission.

Figure 4:
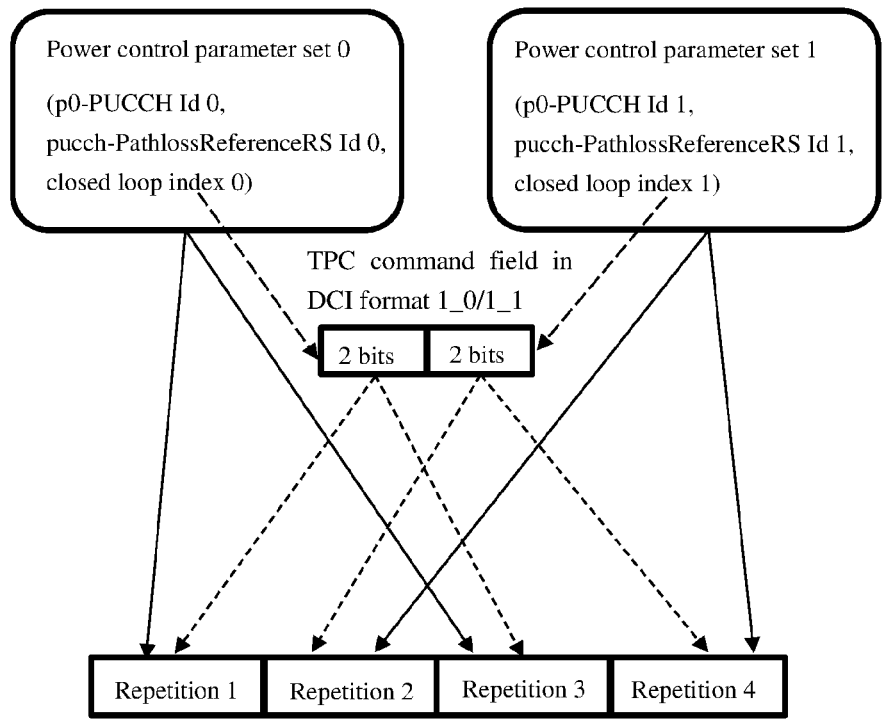
FIG. 4 illustrates another exemplary scheme for determining power of PUCCH repetitions of a PUCCH transmission in accordance with some embodiments of the present disclosure.

In some embodiments of the present disclosure, in response to the PUCCH transmission being not configured with spatial relation information; the closed loop index, the power offset identifier, and the pathloss reference RS included in a power control parameter set in the configuration information are predefined. A specific example is shown in FIG. 4.

In step 204, the UE determines power for each PUCCH repetition. The power for each PUCCH repetition may be determined according to the configuration information and a mapping relationship between each PUCCH repetition and a power control parameter set of the plurality of power control parameter sets included in the configuration information.

Figure 3:
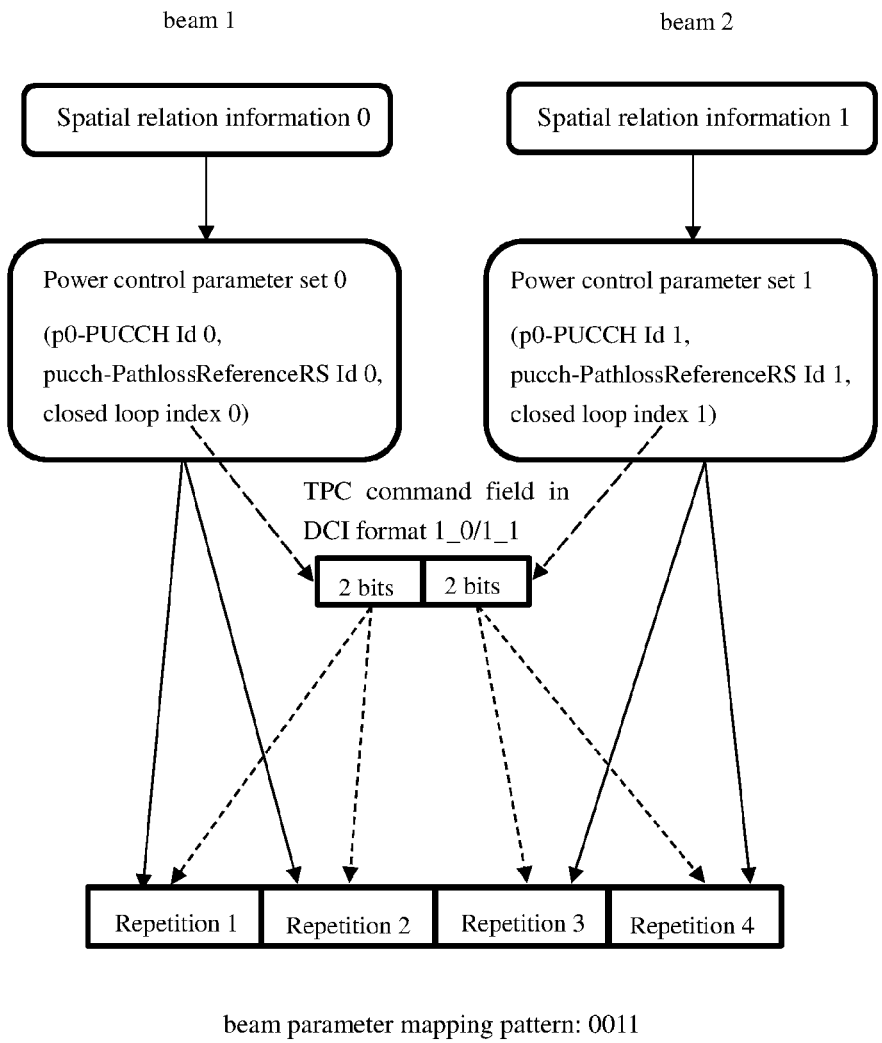
FIG. 3 illustrates an exemplary scheme for determining power of PUCCH repetitions of a PUCCH transmission in accordance with some embodiments of the present disclosure.

For instance, with reference to the embodiments of FIG. 3, the mapping relationship determined in step 204 indicates the beam parameter mapping pattern 0011. With reference to the embodiments of FIG. 4, the mapping relationship determined in step 204 indicates the power control parameter mapping pattern 0101. Details regarding the embodiments of FIGS. 3 and 4 are described below.

In step 206, the UE transmits, by using the determined power for each PUCCH repetition, each PUCCH repetition in the time domain, such as, in a time interval of a plurality of time intervals.

Details described in all other embodiments of the present application (for example, details of how to improve reliability and robustness of PUCCH repetitions of a PUCCH transmission by using multi-TRP and/or multi-panel) are applicable for the embodiments of FIG. 2. Moreover, details described in the embodiments of FIG. 2 are applicable for all the embodiments of FIGS. 1 and 3-7.

Considering that a PUCCH repetition with one or more beams or multiple TRPs may be supported both in FR1 (low carrier frequency range) and FR2 (high carrier frequency range) and one PUCCH transmission will not be configured with spatial relation information especially in FR1, the present application discusses power control mechanisms of PUCCH repetitions in the following two cases:

Case 1: a PUCCH transmission is configured with spatial relation information; and Case 2: a PUCCH transmission is not configured with spatial relation information.

In Case 1, a PUCCH transmission may be configured with multiple pieces of spatial relation information. The multiple pieces of spatial relation information may be activated by a MAC control element (MAC CE). A specific example regarding Case 1 is shown in FIG. 3.

In Case 1, assuming that a PUCCH transmission with one or more beams are received by multiple TRPs, there will be one or more closed power control loops for the PUCCH transmission with one or more beams. Some embodiments of the present disclosure propose that the TPC command field in DCI format 1_0/1_1 is enhanced to separately control different closed power control loops for the PUCCH transmission.

For example, in some embodiments of the present disclosure, if a UE is configured by RRC to maintain M (M>=1) closed power control loops for a PUCCH transmission with one or more beams, and if the UE is configured by RRC signaling to transmit a PUCCH transmission repeatedly in multiple slots, 2 M bits are included in the TPC command field for PUCCH transmission in DCI format 1_0/1_1. In particular, the first 2 bits within the 2 M bits correspond to the closed power control loop index 0, the second 2 bits within the 2 M bits correspond to the closed power control loop index 1, and the third 2 bits (if any) within the 2 M bits correspond to the closed power control loop index 2 (if any), and so on.

According to the 3GPP standard document, the DCI format 2_2 can indicate the TPC command of a closed loop index indicated in the DCI format 2_2 for all PUCCH transmissions of a UE. According to some embodiments of the present disclosure, in which multiple closed loops are maintained for a PUCCH transmission, multiple DCI format 2_2 may be used to indicate the TPC commands of multiple closed loops, or an enhanced DCI format 2_2 may be used to indicate multiple TPC commands of multiple closed loops for a UE.

Mapping between configured spatial relation information (beam) and configured power control parameter set may be referred to as a beam mapping pattern. In some embodiments of the present disclosure, a beam mapping pattern is indicated for a PUCCH transmission to inform a UE to use which beam to transmit each PUCCH repetition of the PUCCH transmission. When there is one to one mapping between the configured spatial relation information (beam) and the configured power control parameter set and the corresponding TPC command, a power control mechanism of each PUCCH repetition of the PUCCH transmission may be calculated by using the method disclosed in 3GPP standard document TS38.213 7.2 according to the beam mapping pattern.

FIG. 3 illustrates an exemplary scheme for determining power of PUCCH repetitions of a PUCCH transmission in accordance with some embodiments of the present disclosure.

The embodiments of FIG. 3 assume that a PUCCH transmission is configured to be transmitted repeatedly in 4 slots, and 2 beams are configured for the PUCCH transmission, respectively corresponding to spatial relation information 0 and spatial relation information 1. As shown in FIG. 3, a PUCCH transmission is configured with 4 PUCCH repetitions, i.e., repetition 1, repetition 2, repetition 3, and repetition 4 as shown in FIG. 3, while 2 beams are configured for the PUCCH transmission. Beam 1 corresponds to spatial relation information 0, and beam 2 corresponds to spatial relation information 1, respectively.

The spatial relation information 0 and the spatial relation information 1 are associated with two PUCCH power control parameter sets, respectively. Each PUCCH power control parameter set includes a p0-PUCCH identifier value, a PUCCH pathloss reference RS identifier value, and a closed loop index value.

As shown in FIG. 3, the spatial relation information 0 is configured to be associated with power control parameter set 0. The power control parameter set 0 includes three parameters: p0-PUCCH Id 0, PUCCH pathloss reference RS Id 0 and closed loop index 0.

As shown in FIG. 3, the spatial relation information 1 is configured to be associated with power control parameter set 1. The power control parameter set 1 includes three parameters: p0-PUCCH Id 1, PUCCH pathloss reference RS Id 1, and closed loop index 1.

According to the embodiments of FIG. 3, assuming that a UE is configured to maintain 2 closed power control loops by RRC signalling and the PUCCH transmission is scheduled by DCI 1_0/1_1 to provide HARQ-ACK feedback corresponding to the scheduled PDSCH, there are 4 bits in the TPC command field of the corresponding DCI, as shown in FIG. 3. Within these 4 bits, the first 2 bits in the TPC command field of DCI format 1_0/1_1 is the TPC command of closed loop index 0, and the second 2 bits in the TPC command field of DCI format 1_0/1_1 is the TPC command of closed loop index 1. The first 2 bits of the TPC command are associated with power control parameter set 0, because power control parameter set 0 includes closed loop index 0 as shown in FIG. 3. The second 2 bits of the TPC command are associated with power control parameter set 1, because power control parameter set 1 includes closed loop index 1 as shown in FIG. 3.

The embodiments of FIG. 3 assume that the beam mapping pattern is 0011, which means the spatial relation information 0 is used for transmitting the first and second PUCCH repetitions, and the spatial relation information 1 is used for transmitting the third and fourth PUCCH repetitions. In other words, the embodiments of FIG. 3 assume that the spatial relation information 0 is used for the first and second repetitions, i.e., repetition 1 and repetition 2 as shown in FIG. 3. The embodiments of FIG. 3 assume that the spatial relation information 1 is used for the third and fourth repetitions, i.e., repetition 3 and repetition 4 as shown in FIG. 3.

According to the embodiments of FIG. 3, since spatial relation information 0 is associated with power control parameter set 0 and the first 2 bits of the TPC command of DCI format 1_0/1_1, the power of each of repetition 1 and repetition 2 may be determined by the power control parameter set 0 and its associated TPC command of DCI format 1_0/1_1 as shown in FIG. 3. Since spatial relation information 1 is associated with power control parameter set 1 and the second 2 bits of the TPC command of DCI format 1_0/1_1, the power of each of repetition 3 and repetition 4 may be determined by the power control parameter set 1 and its associated TPC command of DCI format 1_0/1_1 as shown in FIG. 3.

In Case 2, a PUCCH transmission is not configured with spatial relation information, and PUCCH repetitions of the PUCCH transmission are transmitted to multiple TRPs, repeatedly. This case is different from PUCCH repetitions in 3GPP NR Release 15. Although a power control mechanism of each PUCCH repetition of a PUCCH transmission is the same as that in 3GPP NR Release 15, links between a UE and different TRPs are very different, and therefore, the power control mechanism of different links between the UE and TRPs are different from that for 3GPP NR Release 15. Some embodiments of the present disclosure assume that multiple power control parameter sets should be configured for a PUCCH transmission repeatedly transmitted by a UE but received by multiple TRPs. A specific example regarding Case 2 is shown in FIG. 4.

Some embodiments of the present disclosure assume that multiple p0-PUCCH values are configured for multiple PUCCH repetitions of a PUCCH transmission received by multiple TRPs, which means that a PUCCH transmission configured for multiple PUCCH repetitions is configured with multiple predefined indexes of p0-PUCCH-Id configured in p0-Set. For instance, if the embodiments of FIG. 4 assume that multiple PUCCH repetitions of the PUCCH transmission are received by N TRPs (N>=2), the PUCCH transmission without configuring spatial relation information is configured with N predefined indexes of p0-PUCCH-Id. The N predefined indexes of p0-PUCCH-Id are configured in p0-Set and correspond to N p0-PUCCH values in p0-PUCCH-Value.

Some embodiments of the present disclosure assume that only one p0-PUCCH value is configured for multiple PUCCH repetitions of a PUCCH transmission received by multiple TRPs. The only one p0-PUCCH represents the target receiving power at the TRPs after the pathloss being compensated. A UE can be configured one or multiple p0-PUCCH values with predefined p0-PUCCH indexes for multiple PUCCH repetitions of a PUCCH transmission in these embodiments. In these embodiments, the only one p0-PUCCH value may be with the minimum p0-PUCCH-Id in p0-Set. The only one p0-PUCCH value may be obtained by the same method as that in 3GPP NR Release 15.

In some embodiments of the present disclosure, multiple pathloss reference RSs are configured for multiple PUCCH repetitions of a PUCCH transmission received by multiple TRPs, which means that the PUCCH transmission configured for repetition is configured with multiple predefined indexes of pucch-PathlossReferenceRS-Id that are configured in PUCCH-PathlossReferenceRS. For example, in these embodiments, if the PUCCH transmission with repetition is received by N TRPs, the PUCCH transmission without configuring spatial relation information is configured with N pathloss reference RSs with predefined N indexes of pucch-PathlossReferenceRS-Id.

In some embodiments of the present disclosure of Case 2, if the PUCCH transmission is not configured with spatial relation information, the closed loop index, the power offset identifier, and the pathloss reference RS included in each power control parameter set may be predefined.

In some embodiments of the present disclosure, the closed loop index of a PUCCH transmission without configuring spatial relation information is fixed to 0. In these embodiments, multiple closed loop indexes may be maintained in a UE. For example, in these embodiments, if UE is configured to maintain M (M>=1) closed loops, 2 M bits are included in the TPC command field for PUCCH transmission in DCI format 1_0/1_1. The first 2 bits within the 2 M bits correspond to the closed power control loop index 0, the second 2 bits within the 2 M bits corresponds to the closed power control loop index 1, and the third 2 bits within the 2 M bits (if any) corresponds to the closed power control loop index 2 (if any), and so on. These embodiments assume that M equals to the number of TRPs receiving the PUCCH transmission with multiple PUCCH repetitions.

Some embodiments of the present disclosure refer to a case in which there are 2 TRPs receiving the PUCCH transmission with repetition. In these embodiments, two predefined PUCCH power control parameter sets are configured for a PUCCH transmission with repetition. A PUCCH power control parameter set includes a p0-PUCCH identifier, a pathloss reference RS identifier, and a closed loop index value, the closed loop index value is associated with a TPC command with 2 bit in a TPC command field of a DCI format 1_0/1_1 or a TPC command with 2 bit in a DCI format 2_2.

For instance, in these embodiments, PUCCH power control parameter set 0 includes the p0-PUCCH with the lower index of the predefined indexes of p0-PUCCH-Id configured in p0-Set, the pathloss reference RS with lower index of predefined indexes of pucch-PathlossReferenceRS-Id, and the closed loop index 0. PUCCH power control parameter set 1 includes the p0-PUCCH with the higher index among the predefined indexes of p0-PUCCH-Id configured in p0-Set, the pathloss reference RS with higher index among predefined indexes of pucch-PathlossReferenceRS-Id, and the closed loop index 1.

In these embodiments, the number of predefined p0-PUCCH indexes may be configured as 1 or 2. If there is only 1 predefined p0-PUCCH index configured for the PUCCH transmission, the p0-PUCCH in power control parameter set 0 is same as those in the p0-PUCCH in power control parameter set 1.

In addition, although no spatial relation information is configured for the PUCCH transmission in these embodiments, multiple PUCCH control parameter sets are configured for the PUCCH transmission with multiple repetitions, and a power control parameter mapping pattern between the multiple PUCCH control parameter sets and multiple PUCCH repetitions of the PUCCH transmission may be configured, to indicate a UE to use which power control parameter set during determining transmitting power for each PUCCH repetition of the PUCCH transmission.

FIG. 4 illustrates another exemplary scheme for determining power of PUCCH repetitions of a PUCCH transmission in accordance with some embodiments of the present disclosure.

The embodiments of FIG. 4 assume that a PUCCH transmission is configured to be transmitted repeatedly in 4 slots which are received by 2 TRPs. As shown in FIG. 4, a PUCCH transmission is configured with 4 PUCCH repetitions, i.e., repetition 1, repetition 2, repetition 3, and repetition 4 as shown in FIG. 4.

The PUCCH transmission in the embodiments of FIG. 4 is configured with 2 p0-PUCCH values with predefined indexes of p0-PUCCH-Id (p0-PUCCH 0 and p0-PUCCH 1), 2 pathloss reference RSs with predefined indexes of pucch-PathlossReferenceRS-Id (pucch-PathlossReferenceRS 0 and pucch-PathlossReferenceRS 1), and 2 closed loop index (0 and 1). PUCCH power control parameter set 0 includes p0-PUCCH Id 0, pucch-PathlossReferenceRS Id 0 and closed loop index 0. PUCCH power control parameter set 1 includes p0-PUCCH Id 1, pucch-PathlossReferenceRS Id 1 and closed loop index 1.

The embodiments of FIG. 4 assume that the PUCCH transmission is scheduled by DCI format 1_0/1_1, and there are 4 bits in the TPC command filed in the corresponding DCI. Specifically, as shown in FIG. 4, the first 2 bits within the 4 bits are the TPC command of the closed loop index 0, and the second 2 bits within the 4 bits are the TPC command of the closed index 1. The first 2 bits in the TPC command field of DCI format 1_0/1_1 is associated with PUCCH power control parameter set 0, and the second 2 bits in the TPC command filed of DCI format 1_0/1_1 is associated with PUCCH power control parameter set 1, respectively, as shown in FIG. 4.

The embodiments of FIG. 4 assume that power control parameter mapping pattern is 0101, which means the power of each of repetition 1 and repetition 3 is determined according to power control parameter set 0 and its associated TPC command, and the power of each of repetition 2 and repetition 4 is determined according to power control parameter set 1 and its associated TPC command as shown in FIG. 4.

Figure 5:
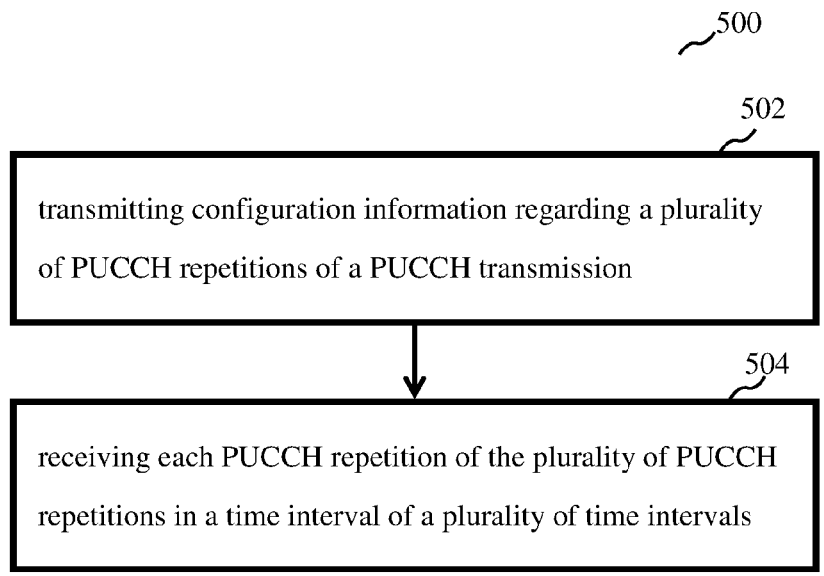
FIG. 5 illustrates a flow chart of a method for wireless communications in accordance with some embodiments of the present application.

FIG. 5 illustrates a flow chart of a method for wireless communications in accordance with some embodiments of the present application. The embodiments of FIG. 5 may be performed by a BS (e.g., BS 102 as illustrated and shown in FIG. 1).

In the exemplary method 500 as illustrated and shown in FIG. 5, in step 502, a BS transmits configuration information regarding a plurality of PUCCH repetitions of a PUCCH transmission. In some embodiments of the present disclosure, the configuration information is configured by RRC signaling.

In some embodiments of the present disclosure, the configuration information includes a plurality of power control parameter sets corresponding to the plurality of PUCCH repetitions. Each power control parameter set of the plurality of the power control parameter sets may at least include a power offset identifier, a pathloss reference RS identifier, and a closed loop index.

The power offset identifier may be included in a power offset list, the pathloss reference RS identifier is included in a pathloss reference RS list, and the closed loop index is a value of a plurality of predefined values. The power offset list or the pathloss reference RS list may be configured by high layer signaling.

In some embodiments of the present disclosure, if the PUCCH transmission is not configured with spatial relation information, the closed loop index, the power offset identifier, and the pathloss reference RS included in a power control parameter set in the configuration information may be predefined.

In step 504, the BS receives each PUCCH repetition of the plurality of PUCCH repetitions in a time interval of a plurality of time intervals. The power for each PUCCH repetition may be determined according to the configuration information and a mapping relationship between the each PUCCH repetition and a power control parameter set of the plurality of power control parameter sets.

For instance, with reference to the embodiments of FIG. 3, the mapping relationship in step 504 indicates the beam parameter mapping pattern 0011. With reference to the embodiments of FIG. 4, the mapping relationship in step 504 indicates the power control parameter mapping pattern 0101.

Details described in all other embodiments of the present application (for example, details of how to improve reliability and robustness of PUCCH repetitions of a PUCCH transmission by using multi-TRP and/or multi-panel) are applicable for the embodiments of FIG. 5. Moreover, details described in the embodiments of FIG. 5 are applicable for all the embodiments of FIGS. 1-4, 6, and 7.

Figure 6:
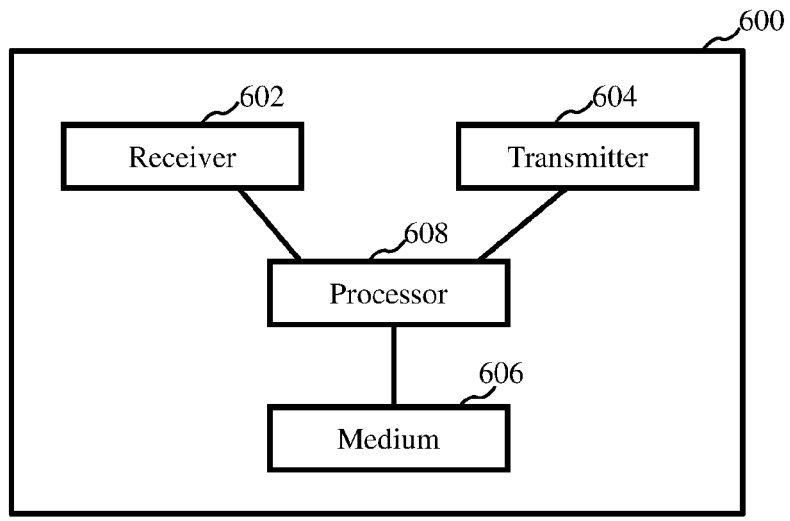
FIG. 6 illustrates an exemplary block diagram of an apparatus in accordance with some embodiments of the present application.

FIG. 6 illustrates an exemplary block diagram of an apparatus in accordance with some embodiments of the present application. In some embodiments of the present disclosure, the apparatus 600 may be a UE, which can at least perform the method illustrated in FIG. 2.

As shown in FIG. 6, the apparatus 600 may include at least one receiver 602, at least one transmitter 604, at least one non-transitory computer-readable medium 606, and at least one processor 608 coupled to the at least one receiver 602, the at least one transmitter 604, and the at least one non-transitory computer-readable medium 606.

Although in FIG. 6, elements such as receiver 602, transmitter 604, non-transitory computer-readable medium 606, and processor 608 are described in the singular, the plural is contemplated unless limitation to the singular is explicitly stated. In some embodiments of the present disclosure, the at least one receiver 602 and the at least one transmitter 604 are combined into a single device, such as a transceiver. In certain embodiments of the present disclosure, the apparatus 600 may further include an input device, a memory, and/or other components.

In some embodiments of the present disclosure, the at least one non-transitory computer-readable medium 606 may have stored thereon computer-executable instructions which are programmed to implement the steps of the methods, for example as described in view of FIG. 2, with the at least one receiver 602, the at least one transmitter 604, and the at least one processor 608.

For example, the at least one receiver 602 may receive configuration information regarding a plurality of PUCCH repetitions of a PUCCH transmission, and the configuration information includes a plurality of power control parameter sets corresponding to the plurality of PUCCH repetitions. The at least one processor 608 may determine power for each PUCCH repetition of the plurality of PUCCH repetitions according to the configuration information and a mapping relationship between the each PUCCH repetition and a power control parameter set of the plurality of power control parameter sets. The at least one transmitter 604 may transmit, by using the determined power for the each PUCCH repetition, the each PUCCH repetition in a time interval of a plurality of time intervals.

Figure 7:
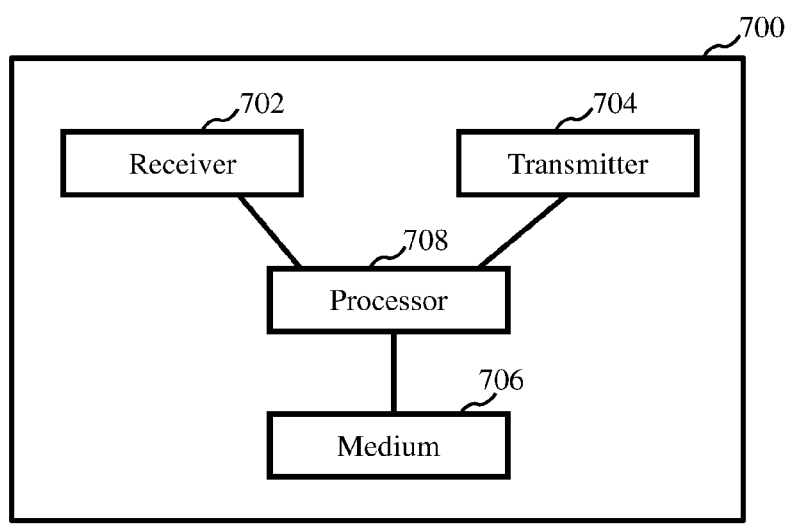
FIG. 7 illustrates an exemplary block diagram of an apparatus in accordance with some embodiments of the present application.

FIG. 7 illustrates an exemplary block diagram of an apparatus in accordance with some embodiments of the present application. In some embodiments of the present disclosure, the apparatus 700 may be a BS (e.g., gNB), which can at least perform the method illustrated in FIG. 5.

As shown in FIG. 7, the apparatus 700 may include at least one receiver 702, at least one transmitter 704, at least one non-transitory computer-readable medium 706, and at least one processor 708 coupled to the at least one receiver 702, the at least one transmitter 704, and the at least one non-transitory computer-readable medium 706.

Although in FIG. 7, elements such as receiver 702, transmitter 704, non-transitory computer-readable medium 706, and processor 708 are described in the singular, the plural is contemplated unless limitation to the singular is explicitly stated. In some embodiments of the present disclosure, the at least one receiver 702 and the at least one transmitter 704 are combined into a single device, such as a transceiver. In certain embodiments of the present disclosure, the apparatus 700 may further include an input device, a memory, and/or other components.

In some embodiments of the present disclosure, the at least one non-transitory computer-readable medium 706 may have stored thereon computer-executable instructions which are programmed to implement the steps of the methods, for example as described in view of FIG. 5, with the at least one receiver 702, the at least one transmitter 704, and the at least one processor 708.

For example, the at least one transmitter 704 may transmit configuration information regarding a plurality of PUCCH repetitions of a PUCCH transmission, and the configuration information includes a plurality of power control parameter sets corresponding to the plurality of PUCCH repetitions. The at least one receiver 702 may receive each PUCCH repetition of the plurality of PUCCH repetitions in a time interval of a plurality of time intervals, and power for the each PUCCH repetition is determined according to the configuration information and a mapping relationship between the each PUCCH repetition and a power control parameter set of the plurality of power control parameter sets.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A user equipment (UE) for wireless communication, comprising:
   at least one memory; and
   at least one processor coupled with the at least one memory and configured to cause the UE to:
   receive configuration information regarding a plurality of physical uplink control channel (PUCCH) repetitions of a PUCCH transmission, wherein the configuration information includes a plurality of power control parameter sets corresponding to the plurality of PUCCH repetitions, wherein each power control parameter set of the plurality of the power control parameter sets at least includes a power offset identifier, a pathloss reference reference signal (RS) identifier, and a closed loop index, and wherein the power offset identifier is included in a power offset list;
   determine power for each PUCCH repetition of the plurality of PUCCH repetitions according to the configuration information and a mapping relationship between each PUCCH repetition and a power control parameter set of the plurality of power control parameter sets; and
   transmit, by using the determined power for the each PUCCH repetition, each PUCCH repetition in a time interval of a plurality of time intervals.

2. The UE of claim 1, wherein each power control parameter set is associated with a transmit power control (TPC) command indicated by a downlink control information (DCI), and the DCI is associated with the clos ed loop index included in each power control parameter set.

3. The UE of claim 2, wherein the DCI is used for scheduling the PUCCH transmission.

4. The UE of claim 3, wherein the DCI includes a TPC command field, and the TPC command field indicates TPC commands of a plurality of closed loop indexes.

5. The UE of claim 1, wherein the pathloss reference RS identifier is included in a pathloss reference RS list, and the closed loop index is a value of a plurality of predefined values.

6. The UE of claim 5, wherein at least one of the power offset list or the pathloss reference RS list is configured by high layer signaling.

7. The UE of claim 1, wherein, in response to the PUCCH transmission being not configured with spatial relation information, the closed loop index, the power offset identifier and the pathloss reference RS included in each power control parameter set are predefined.

8. The UE of claim 1, wherein each power control parameter set of the plurality of power control parameter sets is associated with one piece of spatial relation information of a plurality of pieces of spatial relation information configured for the PUCCH transmission.

9. A base station (BS) for wireless communication, comprising:
   at least one memory; and
   at least one processor coupled with the at least one memory and configured to cause the BS to:
   transmit configuration information regarding a plurality of physical uplink control channel (PUCCH) repetitions of a PUCCH transmission, wherein the configuration information includes a plurality of power control parameter sets corresponding to the plurality of PUCCH repetitions, wherein each power control parameter set of the plurality of the power control parameter sets at least includes a power offset identifier, a pathloss reference reference signal (RS) identifier, and a closed loop index, and wherein the power offset identifier is included in a power offset list; and
   receive each PUCCH repetition of the plurality of PUCCH repetitions in a time interval of a plurality of time intervals, wherein power for each PUCCH repetition is determined according to the configuration information and a mapping relationship between each PUCCH repetition and a power control parameter set of the plurality of power control parameter sets.

10. The BS of claim 9, wherein each power control parameter set is associated with a transmit power control (TPC) command indicated by a downlink control information (DCI), and the DCI is associated with the closed loop index included in the each power control parameter set.

11. The BS of claim 10, wherein the DCI is used for scheduling the PUCCH transmission.

12. The BS of claim 11, wherein the DCI includes a TPC command field, and the TPC command field indicates TPC commands of a plurality of closed loop indexes.

13. The BS of claim 9, wherein the pathloss reference RS identifier is included in a pathloss reference RS list, and the closed loop index is a value of a plurality of predefined values.

14. The BS of claim 13, wherein at least one of the power offset list or the pathloss reference RS list is configured by high layer signaling.

15. The BS of claim 9, wherein, in response to the PUCCH transmission being not configured with spatial relation information, the closed loop index, the power offset identifier and the pathloss reference RS included in each power control parameter set are predefined.

16. The BS of claim 9, wherein each power control parameter set of the plurality of power control parameter sets is associated with one piece of spatial relation information of a plurality of pieces of spatial relation information configured for the PUCCH transmission.

17. A method performed by a user equipment (UE), the method comprising:
receiving configuration information regarding a plurality of physical uplink control channel (PUCCH) repetitions of a PUCCH transmission, wherein the configuration information includes a plurality of power control parameter sets corresponding to the plurality of PUCCH repetitions, wherein each power control parameter set of the plurality of the power control parameter sets at least includes a power offset identifier, a pathloss reference reference signal (RS) identifier, and a closed loop index, and wherein the power offset identifier is included in a power offset list;
determining power for each PUCCH repetition of the plurality of PUCCH repetitions according to the configuration information and a mapping relationship between each PUCCH repetition and a power control parameter set of the plurality of power control parameter sets; and
transmitting, by using the determined power for each PUCCH repetition, the each PUCCH repetition in a time interval of a plurality of time intervals.

18. The method of claim 17, wherein each power control parameter set is associated with a transmit power control (TPC) command indicated by a downlink control information (DCI), and the DCI is associated with the closed loop index included in each power control parameter set.

19. The method of claim 18, wherein the DCI is used for scheduling the PUCCH transmission.

20. A method performed by a base station, the method comprising:
transmitting configuration information regarding a plurality of physical uplink control channel (PUCCH) repetitions of a PUCCH transmission, wherein the configuration information includes a plurality of power control parameter sets corresponding to the plurality of PUCCH repetitions, wherein each power control parameter set of the plurality of the power control parameter sets at least includes a power offset identifier, a pathloss reference reference signal (RS) identifier, and a closed loop index, and wherein the power offset identifier is included in a power offset list; and
receiving each PUCCH repetition of the plurality of PUCCH repetitions in a time interval of a plurality of time intervals, wherein power for each PUCCH repetition is determined according to the configuration information and a mapping relationship between each PUCCH repetition and a power control parameter set of the plurality of power control parameter sets.

* * * * *